United States Patent
Kuo

(10) Patent No.: US 10,299,250 B2
(45) Date of Patent: May 21, 2019

(54) DEVICE OF REPORTING CONTROL INFORMATION

(71) Applicant: ACER INCORPORATED, New Taipei (TW)

(72) Inventor: Ping-Heng Kuo, New Taipei (TW)

(73) Assignee: ACER INCORPORATED, New Taipei (TW)

(*) Notice: Subject to any disclaimer, the term of this patent is extended or adjusted under 35 U.S.C. 154(b) by 8 days.

(21) Appl. No.: 14/922,186

(22) Filed: Oct. 25, 2015

(65) Prior Publication Data
US 2016/0135159 A1     May 12, 2016

Related U.S. Application Data

(60) Provisional application No. 62/076,484, filed on Nov. 7, 2014.

(51) Int. Cl.
| | |
|---|---|
| *H04B 7/06* | (2006.01) |
| *H04W 72/04* | (2009.01) |
| *H04B 7/0417* | (2017.01) |
| *H04B 7/0456* | (2017.01) |

(52) U.S. Cl.
CPC ...... *H04W 72/0406* (2013.01); *H04B 7/0417* (2013.01); *H04B 7/0456* (2013.01); *H04B 7/065* (2013.01); *H04B 7/0647* (2013.01); *H04B 7/063* (2013.01)

(58) Field of Classification Search
None
See application file for complete search history.

(56) References Cited

U.S. PATENT DOCUMENTS

| | | | |
|---|---|---|---|
| 2009/0207784 A1 | 8/2009 | Lee | |
| 2010/0202372 A1* | 8/2010 | Chun | H04L 5/0057 370/329 |
| 2013/0028129 A1* | 1/2013 | Chun | H04B 7/024 370/252 |
| 2013/0077580 A1* | 3/2013 | Kang | H04B 7/061 370/329 |
| 2013/0259151 A1* | 10/2013 | Thomas | H04L 25/03949 375/267 |
| 2013/0301746 A1 | 11/2013 | Mobasher | |
| 2013/0308715 A1 | 11/2013 | Nam | |
| 2014/0050280 A1 | 2/2014 | Stirling-Gallacher | |
| 2014/0064400 A1 | 3/2014 | Nammi | |

(Continued)

FOREIGN PATENT DOCUMENTS

| | | |
|---|---|---|
| CN | 102237969 A | 11/2011 |
| CN | 102281128 A | 12/2011 |

(Continued)

*Primary Examiner* — Charles C Jiang
*Assistant Examiner* — Saad Khawar
(74) *Attorney, Agent, or Firm* — Winston Hsu

(57) ABSTRACT

A communication device for reporting control information comprises a storage unit for storing instructions and a processing means coupled to the storage unit. The processing means is configured to execute the instructions stored in the storage unit. The instructions comprise receiving a first period for transmitting analog beamforming information from a network; and receiving a second period for transmitting baseband precoder information from the network, wherein the first period is different from the second period.

11 Claims, 9 Drawing Sheets

(56) References Cited

U.S. PATENT DOCUMENTS

| | | | |
|---|---|---|---|
| 2014/0177683 A1 | 6/2014 | Krishnamurthy | |
| 2014/0266896 A1* | 9/2014 | Hyslop | H04B 7/18506 342/368 |
| 2014/0323144 A1 | 10/2014 | Kim | |
| 2015/0098516 A1 | 4/2015 | Wang | |
| 2015/0208386 A1 | 7/2015 | Yang | |
| 2015/0282122 A1* | 10/2015 | Kim | H04L 25/03898 370/329 |
| 2015/0288497 A1 | 10/2015 | Li | |
| 2015/0318909 A1 | 11/2015 | Zhang | |

FOREIGN PATENT DOCUMENTS

| | | |
|---|---|---|
| CN | 102308636 A | 1/2012 |
| CN | 103634085 A | 3/2014 |
| CN | 103916213 A | 7/2014 |
| EP | 2 890 023 A1 | 7/2015 |
| WO | 2013144361 A1 | 10/2013 |
| WO | 2013185320 A1 | 12/2013 |
| WO | 2014032566 A1 | 3/2014 |
| WO | 2014069821 A1 | 5/2014 |
| WO | 2014094916 A1 | 6/2014 |

\* cited by examiner

DEVICE OF REPORTING CONTROL INFORMATION

CROSS REFERENCE TO RELATED APPLICATIONS

This application claims the benefit of U.S. Provisional Application No. 62/076,484, filed on Nov. 7, 2014 and incorporated herein by reference.

BACKGROUND OF THE INVENTION

1. Field of the Invention

The present invention relates to a communication device used in a wireless communication system, and more particularly, to a communication device for reporting control information in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

In addition, hybrid beamforming is proposed to exploit a massive antenna array, to further improve the performance of the wireless communication system. A baseband precoding and an analog beamforming may be used to realize the hybrid beamforming. The baseband precoding is related to a mapping between logical ports (e.g., data streams) and inputs of transceiver units (e.g., RF chains). The analog beamforming is related to outputs of the transceiver units and antenna elements. The UE may need to report a large amount of control information (e.g., channel state information) to the eNB, such that the eNB can operate the baseband precoding and the analog beamforming accurately (i.e., with a better performance). However, a capacity of UL control channels is usually limited, and may not be sufficient for transmitting all the control information. The transmission of the control information is thus a challenge when the hybrid beamforming is realized.

Thus, efficient reporting of the control information is an important topic to be discussed.

SUMMARY OF THE INVENTION

The present invention therefore provides a communication device for reporting control information to solve the abovementioned problem.

A communication device for reporting control information comprises a storage unit for storing instructions and a processing means coupled to the storage unit. The processing means is configured to execute the instructions stored in the storage unit. The instructions comprise receiving a first period for reporting of analog beamforming information from a network; and receiving a second period for reporting of baseband precoder information from the network, wherein the first period is different from the second period.

A communication device for reporting control information comprises a storage unit for storing instructions and a processing means coupled to the storage unit. The processing means is configured to execute the instructions stored in the storage unit. The instructions comprise transmitting an analog beam indicator (ABI) at a first time instant to a network; and transmitting a rank indicator (RI) at a second time instant to the network, wherein the first time instant is before the second time instant.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
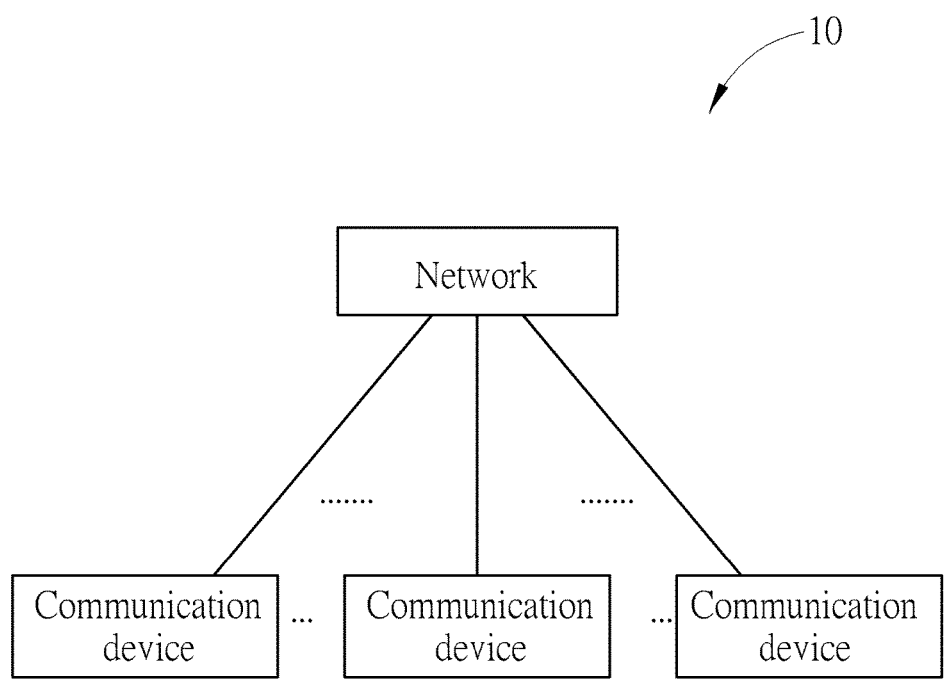
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

The network and the communication device may communicate with each other via multiple antennas. For example, hybrid beamforming realized by a baseband precoding and an analog beamforming may be supported by the network and the communication device. Thus, the communication device may need to feedback control information (e.g., channel state information) for the network to operate the hybrid beamforming accurately according to the control information.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
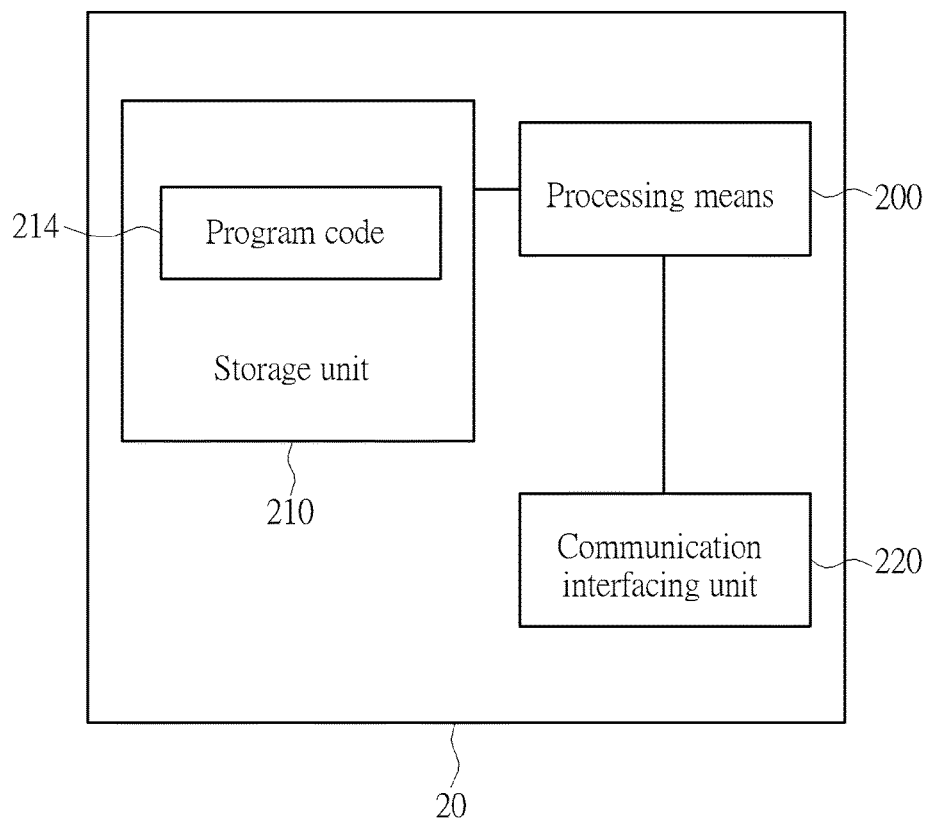
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
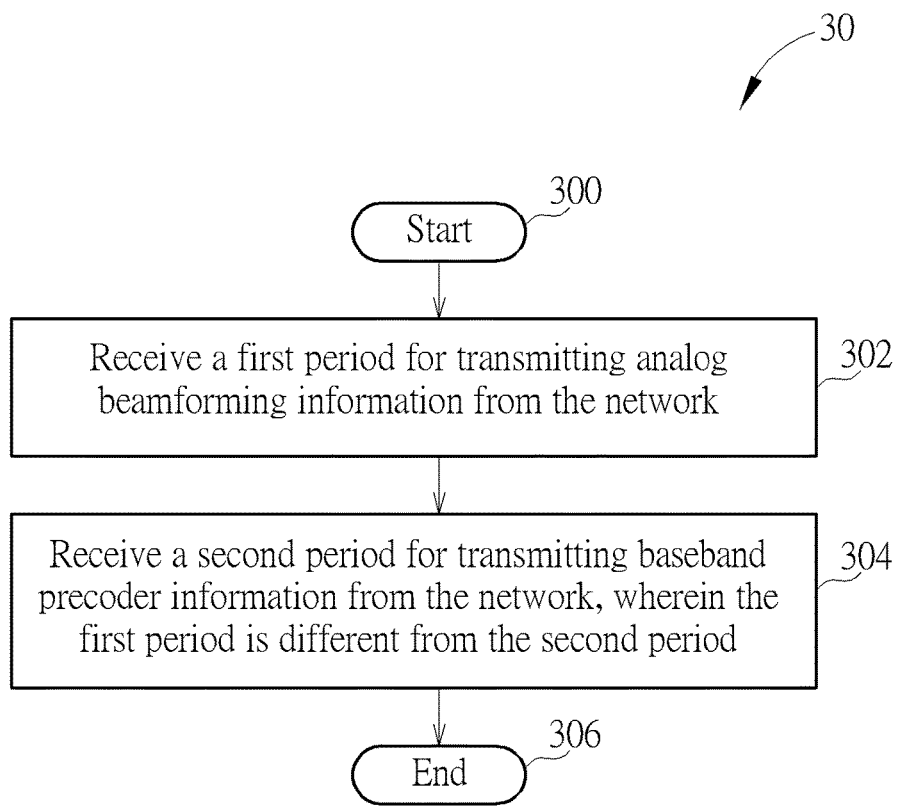
FIG. 3 is a flowchart of a process according to an example of the present invention.

FIG. 3 is a flowchart of a process 30 according to an example of the present invention. The process 30 may be utilized in a communication device shown in FIG. 1, to report control information to the network (e.g., eNB). The process 30 may be compiled into the program code 214 and includes the following steps:

Step 300: Start.

Step 302: Receive a first period for transmitting analog beamforming information from the network.

Step 304: Receive a second period for transmitting baseband precoder information from the network, wherein the first period is different from the second period.

Step 306: End.

According to the process 30, the communication device may receive a first period for transmitting analog beamforming information from the network. The communication device may further receive a second period for transmitting baseband precoder information from the network, wherein the first period is different from the second period. That is, the analog beamforming information and the baseband precoder information may be transmitted periodically with different periods. In one example, the first period may be greater than the second period. That is, the analog beamforming information may be transmitted less frequently than the baseband precoder information. The reason is that the analog beamforming information may be related a geographical location of the communication device, while the baseband precoder information may be related to a small-scale fading status of a channel between the communication device and the network. In other words, the analog beamforming information and the baseband precoder information are reported to the network based on their characteristics. Thus, resources for transmitting the above information are used efficiently.

Realization of the process 30 is not limited to the above description.

In one example, the communication device in the process 30 may transmit the analog beamforming information to the network according to the first period, and may transmit the baseband precoder information to the network according to the second period. That is, the communication device transmits the analog beamforming information and the baseband precoder information periodically according the corresponding periods. In one example, the communication device may transmit the analog beamforming information to the network at a first time instant according to the first period, and may transmit the baseband precoder information to the network at a second time instant according to the second period. That is, the analog beamforming information and the baseband precoder information may be transmitted periodically at different time instants according to the corresponding periods. In one example, the communication device may receive a third period for transmitting the analog beamforming information from the network, and may transmit the analog beamforming information to the network according to the third period. That is, the period for transmitting the analog beamforming information may be updated according to an indication transmitted by the network.

In one example, the first period and the second period in the process 30 may be received in a control signal. That is, the periods may be received in a single message. In another example, the periods may be received in separate messages. Contents in the analog beamforming information and the baseband precoder information are not limited. In one example, the analog beamforming information may include a beam index. In one example, the analog beamforming information may include at least one of elevation angle and at least one azimuth angle. In one example, the analog beamforming information may include a geographic coordinate of the communication device. In one example, the baseband precoder information may include a precoding matrix index (PMI).

Figure 4:
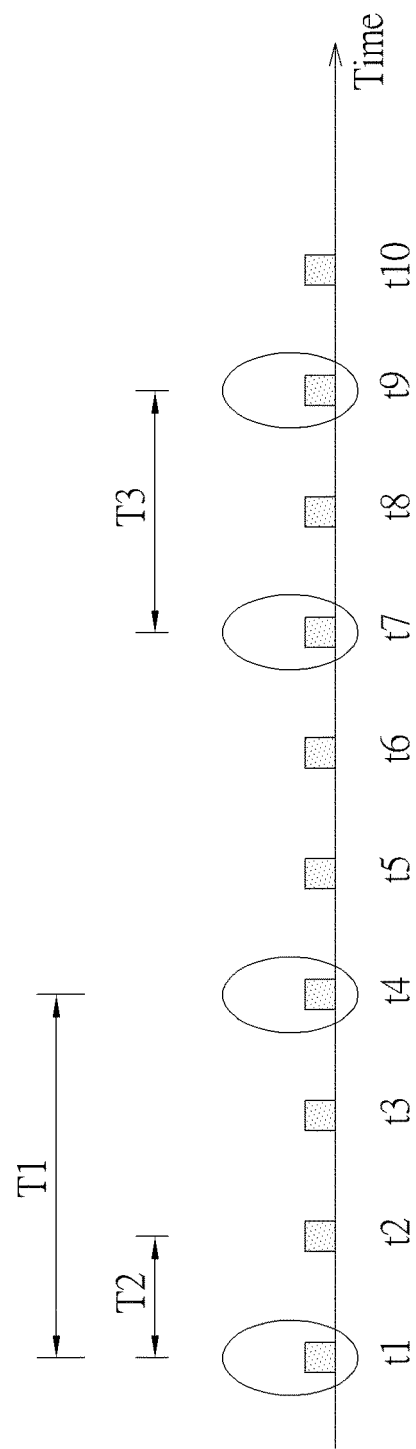
FIG. 4 is a schematic diagram of reporting of control information according to an example of the present invention.

FIG. 4 is a schematic diagram of reporting of control information according to an example of the present invention. In FIG. 4, a UE transmits the analog beamforming information (ellipse) and the baseband precoder information (square) to an eNB at time instants t1-t10. In detail, the analog beamforming information is transmitted at the time instants t1, t4, t7 and t7, and the baseband precoder information is transmitted at the time instants t1-t10. The analog beamforming information is transmitted periodically according to a period T1 before the time instant t7. The baseband precoder information is transmitted periodically according to a period T2. The period T1 is changed to a smaller period T3 at the time instant t7, e.g., after receiving an indication at the time instant t5 from by the eNB. Then, the UE starts to transmit the analog beamforming information at the time instants t7 and t9 the according to the period T3. Note that the analog beamforming information is transmitted with the baseband precoder information in some time instants in the present example. However, this is not a restriction for realizing the present invention, and the analog beamforming information may be transmitted in time instants where no baseband precoder information is transmitted.

Figure 5:
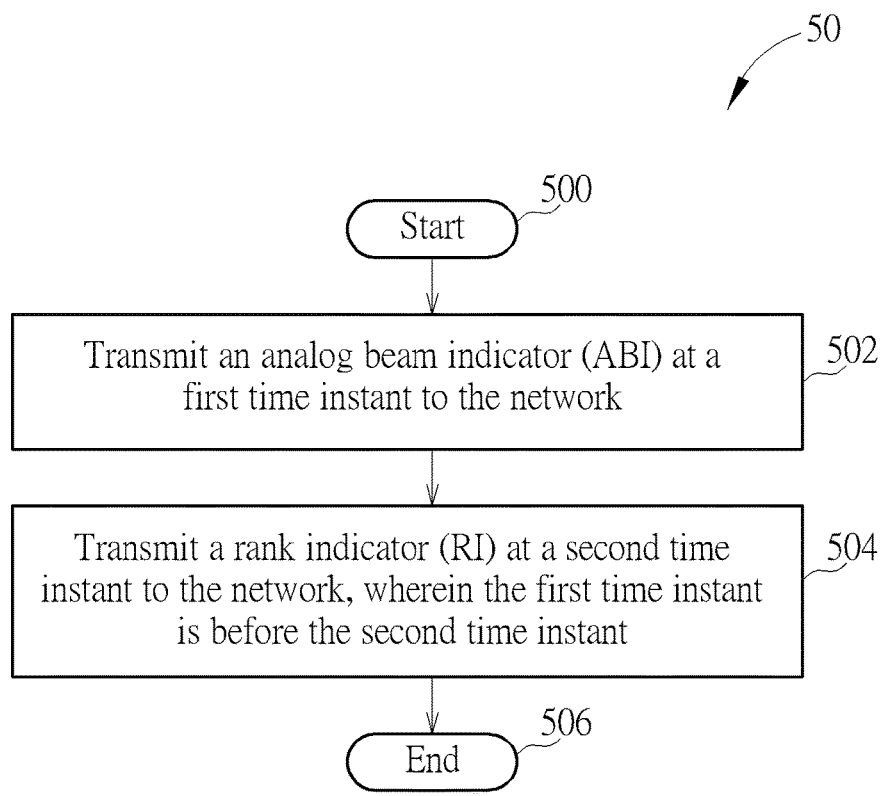
FIG. 5 is a flowchart of a process according to an example of the present invention.

FIG. 5 is a flowchart of a process 50 according to an example of the present invention. The process 50 may be utilized in a communication device shown in FIG. 1, to report control information to the network (e.g., eNB). The process 50 may be compiled into the program code 214 and includes the following steps:

Step 500: Start.

Step 502: Transmit an analog beam indicator (ABI) at a first time instant to the network.

Step 504: Transmit a rank indicator (RI) at a second time instant to the network, wherein the first time instant is before the second time instant.

Step 506: End.

According to the process 50, the communication device may transmit an ABI at a first time instant to the network. The communication device may further transmit a RI at a second time instant to the network, wherein the first time instant is before the second time instant. That is, the ABI and the RI are transmitted at different time instants. Note that a CSI report according to the present invention may include the ABI, the RI, a PMI and a channel quality indicator (CQI), which is different from the original CSI report including only the RI, the PMI and the CQI. In another example, the ABI may be independent control information, and may not be part of the original CSI report. Thus, the network may operate an analog beamforming according to the ABI.

Realization of the process 50 is not limited to the above description.

In one example, the ABI and the RI may be transmitted periodically, and a first period for transmitting the ABI and a second period for transmitting the RI are different. That is, the ABI and the RI are transmitted at different time instants with different periods. Note that the ABI, the RI, the PMI and the CQI may be transmitted in separate CSI reports, when the CSI reports are transmitted periodically.

In another example, the ABI may be transmitted aperiodically. For example, the communication device may receive a control signal transmitted by the network, and may transmit the ABI according to the control signal. That is, the transmission of the ABI may be triggered by the network. For example, the communication device may transmit the ABI, when an event occurs, e.g., a predetermined condition is satisfied. As an example, the communication device may transmit the ABI, when a measured CQI is lower than a predetermined level. Note that the ABI, the RI, the PMI and the CQI may be transmitted in s CSI report, when the CSI report is transmitted aperiodically.

The communication device may transmit the ABI via various ways. In one example, the ABI may be transmitted in a physical UL control channel (PUCCH) to the network, e.g., for a periodic transmission of the ABI. In one example, the ABI may be transmitted in a physical UL shared channel (PUSCH) to the network, e.g., for an aperiodic transmission of the ABI.

Figure 6:
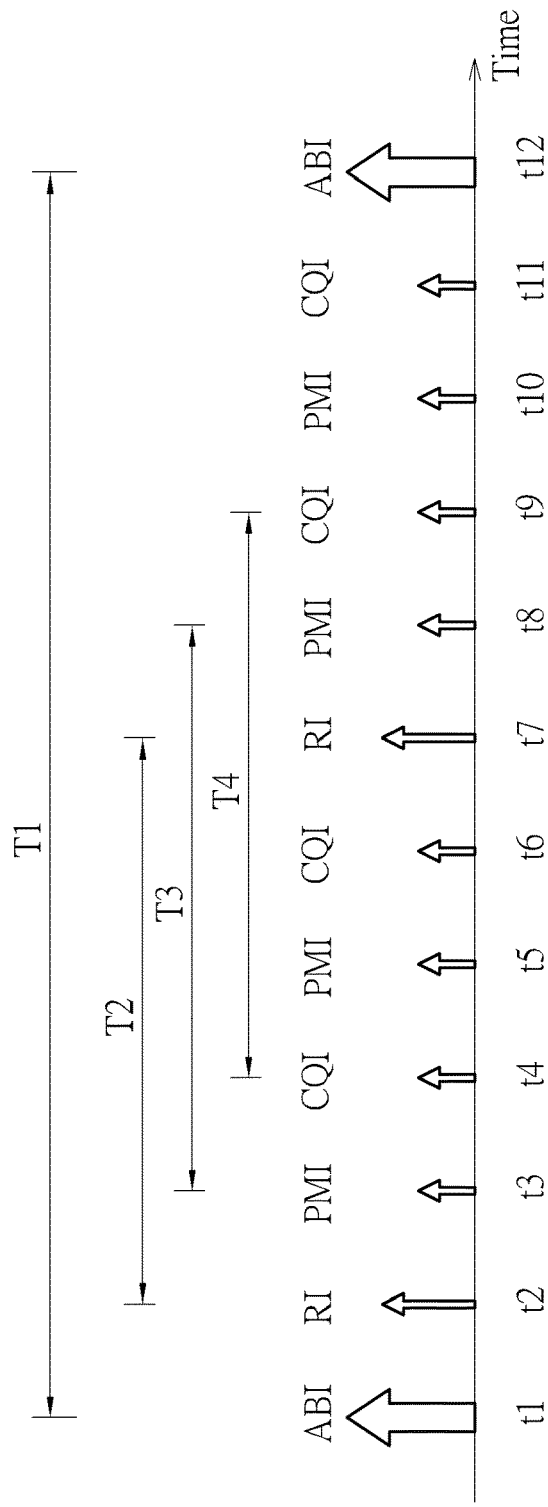
FIG. 6 is a schematic diagram of reporting of control information according to an example of the present invention.

FIG. 6 is a schematic diagram of reporting of control information according to an example of the present invention. In FIG. 6, a UE transmits ABI(s), RI(s), PMI(s) and CQI(s) to an eNB at time instants t1-t12. In detail, the ABIs are transmitted periodically at the time instants t1 and t12 according to a period T1. The RIs are transmitted periodically at the time instants t2 and t7 according to a period T2. The PMIs are transmitted periodically at the time instants t3, t5, t8 and t10 according to a period T3. Note that multiple PMIs may be transmitted within the period T3. The CQIs are transmitted periodically at the time instants t4, t6, t9 and t11 according to a period T4. Note that multiple CQIs may be transmitted within the period T4. As can be seen, the ABI is transmitted with the RIs, the PMIs and the CQIs, while the period of the ABIs and the periods of the RIs, the PMIs and the CQIs may be different.

Figure 7:
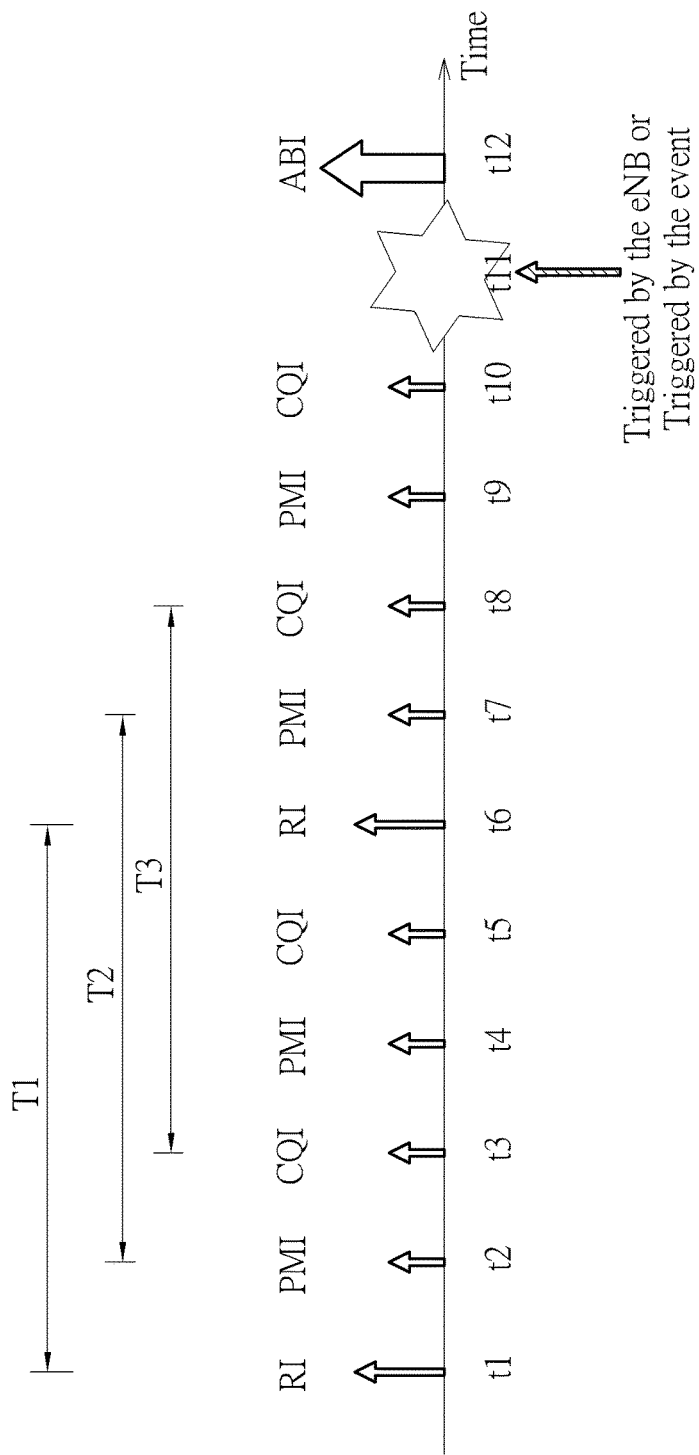
FIG. 7 is a schematic diagram of reporting of control information according to an example of the present invention.

FIG. 7 is a schematic diagram of reporting of control information according to an example of the present invention. In FIG. 7, a UE transmits an ABI, RI(s), PMI (s) and CQI (s) to an eNB at time instants t1-t12. In detail, the RIs are transmitted periodically at the time instants t1 and t6 according to a period T1. The PMIs are transmitted periodically at the time instants t2, t4, t7 and t9 according to a period T2. Note that multiple PMIs may be transmitted within the period T2. The CQIs are transmitted periodically at the time instants t3, t5, t8 and t10 according to a period T3. Note that multiple CQIs may be transmitted within the period T3. The UE may transmit the ABI aperiodically at the time instant t12, when the UE is triggered by the eNB or an event at the time instant t11. As can be seen, the ABI is transmitted with the RIs, the PMIs and the CQIs, when the UE is triggered by the eNB or the eNB.

The description related to FIG. 7 can be summarized in to process 80 and 90 in FIGS. 8 and 9, which are illustrated as follows.

Figure 8:
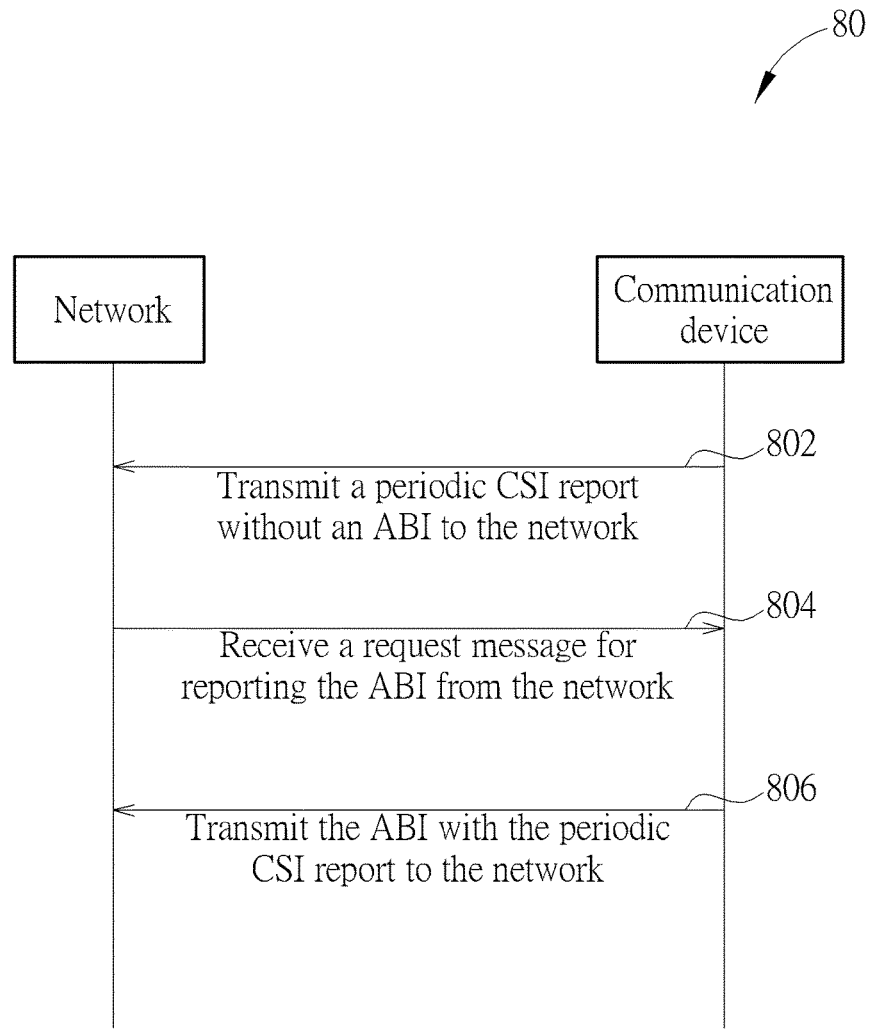
FIG. 8 is a flowchart of a process according to an example of the present invention.

FIG. 8 is a flowchart of a process 80 according to an example of the present invention. The process 80 may be utilized in a communication device shown in FIG. 1, to report control information to the network (e.g., eNB). The process 80 may be compiled into the program code 214 and includes the following steps:

Step 802: Transmit a periodic CSI report without an ABI to the network.

Step 804: Receive a request message for reporting the ABI from the network.

Step 806: Transmit the ABI with the periodic CSI report to the network.

According to the process 80, the communication device may transmit a CSI report (e.g., RI, PMI and/or CQI) without an ABI to the network. The communication device may receive a request message for reporting the ABI from the network. Accordingly, the communication device may transmit the ABI with the periodic CSI report (e.g., RI, PMI and/or CQI) to the network. That is, the communication device transmits the ABI, if the reporting of the ABI is triggered by the network.

Figure 9:
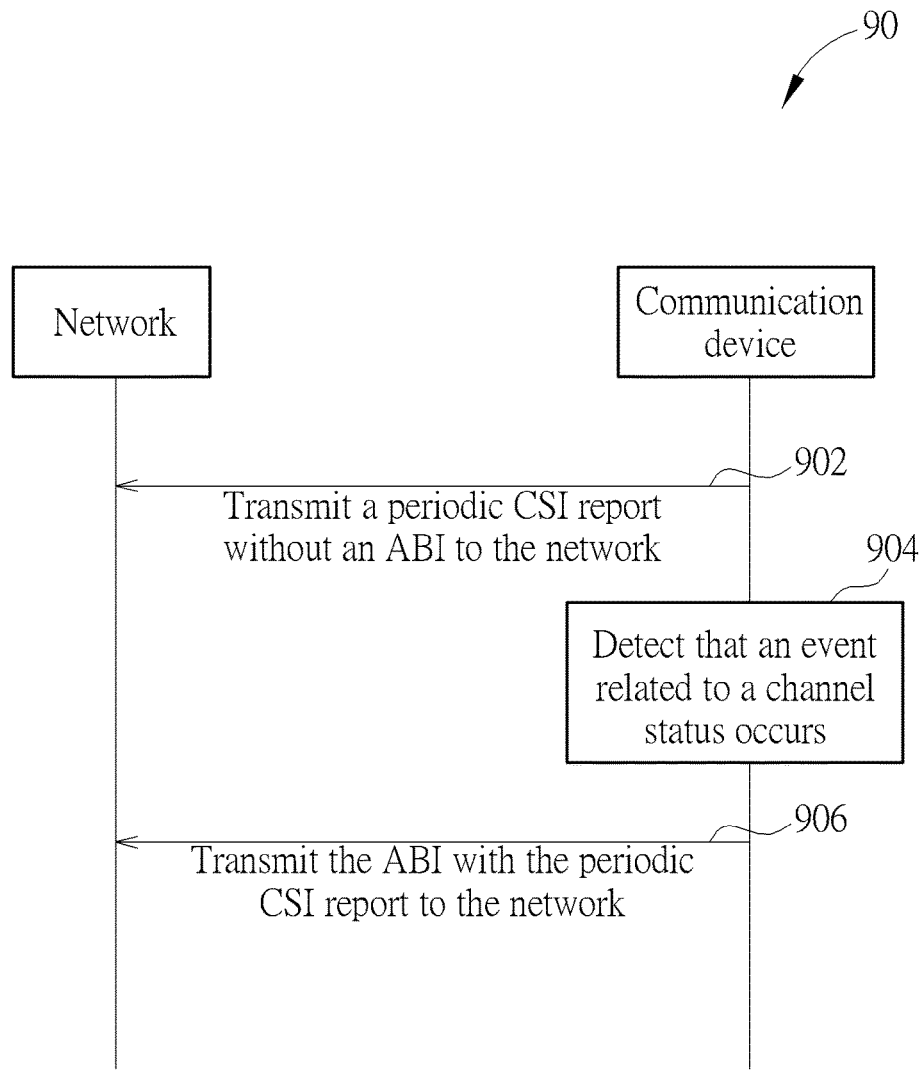
FIG. 9 is a flowchart of a process according to an example of the present invention.

FIG. 9 is a flowchart of a process 90 according to an example of the present invention. The process 90 may be utilized in a communication device shown in FIG. 1, to report control information to the network (e.g., eNB). The process 90 may be compiled into the program code 214 and includes the following steps:

Step 902: Transmit a periodic CSI report without an ABI to the network.

Step 904: Detect that an event related to a channel status occurs.

Step 906: Transmit the ABI with the periodic CSI report to the network.

According to the process 90, the communication device may transmit a CSI report (e.g., RI, PMI and/or CQI) without an ABI to the network. The communication device may detect that an event related to a channel status occurs. For example, a latest CQI is smaller than a predetermined level. Accordingly, the communication device may transmit the ABI with the periodic CSI report (e.g., RI, PMI and/or CQI) to the network. That is, the communication device transmits the ABI, if the reporting of the ABI is triggered by the event.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for reporting control information for multiple antennas. The resource of transmitting the control information can be used efficiently according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for reporting control information, comprising:
a storage device for storing instructions of:
receiving, by a communication interfacing unit, a first period for transmitting analog beamforming information from a network;
receiving, by the communication interfacing unit, a second period for transmitting baseband precoder information from the network, wherein the first period is different from the second period, and the first period and the second period are received in a control signal;
transmitting, by the communication interfacing unit, the analog beamforming information to the network at a first time instant according to the first period; and
transmitting, by the communication interfacing unit, the baseband precoder information to the network at a second time instant according to the second period, wherein the first time instant is different from the second time instant;
wherein the baseband precoder information comprises a precoding matrix index (PMI) and is related to a small-scale fading status of a channel between the communication device and the network, and the analog beamforming information comprises a geographic coordinate of the communication device; and
a processing circuit, coupled to the storage device, configured to execute the instructions stored in the storage device.

2. The communication device of claim 1, wherein the storage device further stores the instruction of:
transmitting, by the communication interfacing unit, the analog beamforming information to the network according to the first period; and
transmitting, by the communication interfacing unit, the baseband precoder information to the network according to the second period.

3. The communication device of claim 1, wherein the storage device further stores the instruction of:
receiving, by the communication interfacing unit, a third period for transmitting the analog beamforming information from the network; and
transmitting, by the communication interfacing unit, the analog beamforming information to the network according to the third period.

4. The communication device of claim 1, wherein the analog beamforming information comprises a beam index.

5. The communication device of claim 1, wherein the analog beamforming information comprises at least one elevation angle and at least one azimuth angle.

6. The communication device of claim 1, wherein the first period is greater than the second period.

7. A communication device for reporting control information, comprising:
a storage device for storing instructions of:
receiving, by a communication interfacing unit, a control signal transmitted by the network;
transmitting, by the communication interfacing unit, an analog beam indicator (ABI) at a first time instant to a network according to the control signal, when a measured channel quality information (CQI) is lower than a predetermined level; and transmitting, by the communication interfacing unit, a rank indicator (RI) at a second time instant to the network, wherein the first time instant is before the second time instant;

wherein the ABI and the RI are transmitted in a channel state information (CSI) report; and a processing circuit, coupled to the storage device, configured to execute the instructions stored in the storage device.

8. The communication device of claim 7, wherein the ABI and the RI are transmitted periodically, and a first period for transmitting the ABI and a second period for transmitting the RI are different.

9. The communication device of claim 7, wherein the communication device transmits the ABI, when an event occurs.

10. The communication device of claim 7, wherein the ABI is transmitted in a physical uplink (UL) control channel (PUCCH) to the network.

11. The communication device of claim 7, wherein the ABI is transmitted in a physical UL shared channel (PUSCH) to the network.

* * * * *